Aug. 4, 1942.　　　A. J. SORENSEN　　　2,292,302
SPEED RESPONSIVE APPARATUS
Filed April 19, 1941
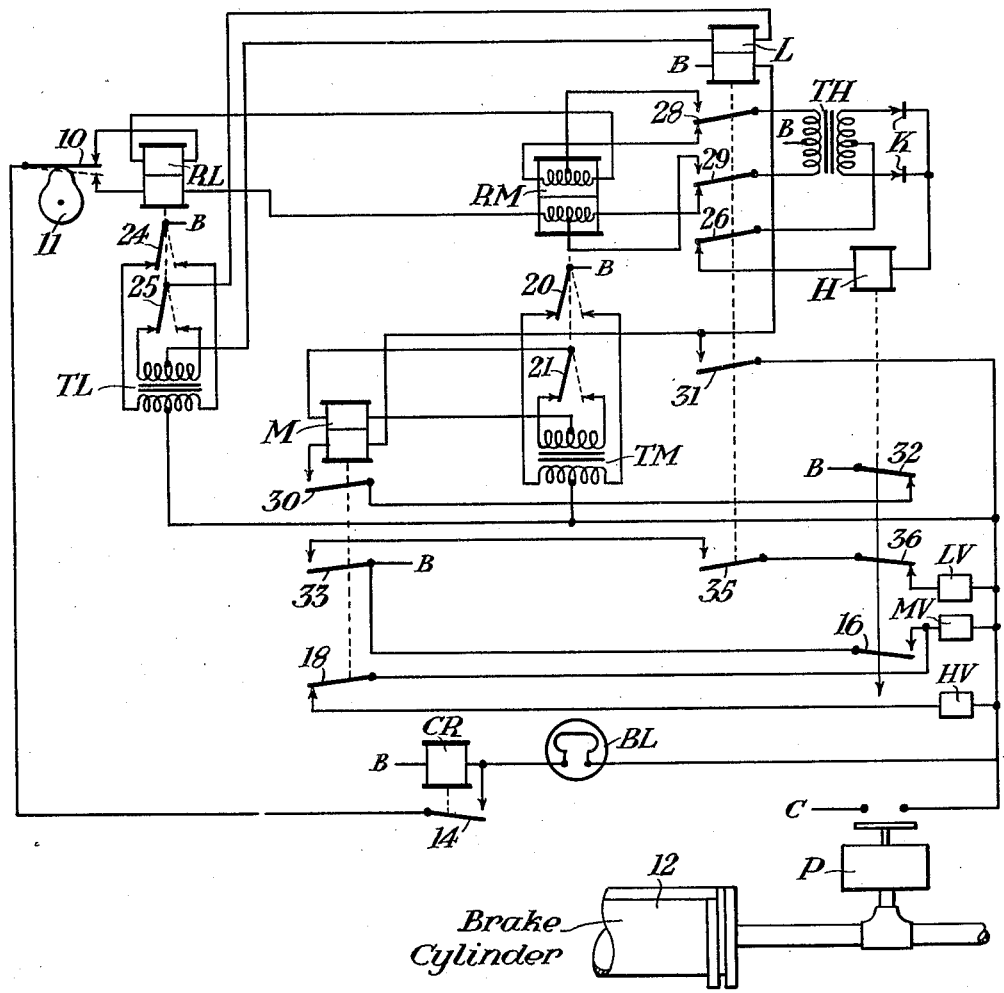
INVENTOR
Andrew J. Sorensen.
BY
HIS ATTORNEY Patented Aug. 4, 1942

2,292,302

UNITED STATES PATENT OFFICE 2,292,302

SPEED RESPONSIVE APPARATUS

Andrew J. Sorensen, Edgewood, Pa., assignor to The Union Switch & Signal Company, Swissvale, Pa., a corporation of Pennsylvania Application April 19, 1941, Serial No. 389,331

7 Claims. (Cl. 303—21)

My invention relates to speed responsive apparatus and particularly to an improved system of the type shown in United States Patent No. 2,193,045, issued to me on March 12, 1940.

It is an object of my invention to provide an improved system of the type described which requires less apparatus than the system shown in the above identified patent.

A further object of my invention is to provide an improved system of the type described which eliminates the need for the zero speed relays employed in the system shown in my patent.

Another object of my invention is to provide an improved system of the type described which is arranged so as to be normally idle, and to be rendered operative only on an application of the brakes.

Other objects of my invention and features of novelty will be apparent from the following description taken in connection with the accompanying drawing.

I shall describe one form of speed responsive apparatus embodying my invention, and shall then point out the novel features thereof in claims.

In the drawing the single figure is a diagram of speed responsive apparatus embodying my invention.

The system shown in the drawing is arranged to control the degree of brake application permitted at different vehicle speeds. This control is obtained by magnet valve devices LV, MV and HV which are incorporated in the vehicle brake system, not shown. The brake system may be of any suitable type, and one form of system which may be employed is shown in United States Patent No. 2,096,505 to George W. Baughman.

The equipment is arranged so that when the magnet valve devices MV and HV are energized, the maximum brake cylinder pressure of which the system is capable can be developed. This pressure is that appropriate for vehicle speeds in excess of 65 miles an hour.

The equipment is also arranged so that when the device MV only is energized, the brake cylinder pressure is limited to a high intermediate value suitable for speeds between 65 and 40 miles an hour, while when none of the valve devices is energized, the brake cylinder pressure is restricted to a low intermediate value appropriate for speeds between 20 and 40 miles an hour. In addition, the brake equipment is arranged so that when the device LV only is energized, the brake cylinder pressure is limited to a low value adapted for vehicle speeds below 20 miles an hour.

The speed responsive apparatus includes polarized relays RL and RM, neutral relays L, M and H and transformers TL, TM and TH. The equipment also includes means operative in accordance with the speed of the vehicle for alternately establishing and interrupting control circuits. As shown, this means consists of a contact 10 which is actuated by a cam on an axle 11 of the vehicle.

The equipment is shown in the condition which it assumes when the vehicle is traveling at a speed in excess of 65 miles an hour and with the brakes released.

As long as the brakes are released, pressure operated switch P is open and interrupts the circuits of the relays, transformers and magnet valve devices so that these are all deenergized. Normally, therefore, the code following master relays do not operate. This reduces the wear on the equipment to the minimum. The switch P is responsive to the pressure of the fluid in a brake cylinder 12 of the vehicle and its contact closes whenever air under pressure is supplied to the brake cylinder.

If the vehicle brakes are applied while the vehicle is traveling at a speed in excess of 65 miles an hour, the switch P will close and energy will be supplied through the ballast lamp BL from a suitable source of direct current, the terminals of which are designated B and C, to the checking relay CR. If the ballast lamp is intact, the contact 14 of relay CR will pick up and establish the circuit of axle operated contact 10. If the ballast lamp BL is defective, relay CR will remain released and energy will not be supplied to the equipment. The equipment will remain deenergized while the braking system will be conditioned to provide the low intermediate value of brake cylinder pressure.

If the relay CR does become energized, then when contact 10 engages its upper contact, energy is supplied to the circuit which includes in series therewith upper winding of relay RL, upper winding of relay RM and upper portion of the primary winding of transformer TH. Similarly, when contact 10 engages its lower contact, energy is supplied to the circuit which includes in series therewith lower winding of relay RL, lower winding of relay RM and the lower portion of the primary winding of transformer TH.

The energy supplied to the upper windings of relays RL and RM causes the contacts of these relays to move to their left-hand positions, as shown, while energy supplied to the lower windings of these relays causes the relay contacts to move to their right-hand positions. The relays RL and RM are of a type the contacts of which remain in the position to which they have been moved until energy is supplied to the relay windings to move the contacts to their other positions.

The energy supplied to the two portions of the primary winding of transformer TH causes flux of opposite polarity to be developed in the transformer core so that the impedance of these windings increases in accordance with the rate at which the circuits of the two windings are established. The various parts of the equipment are arranged and proportioned so that when the portions of the transformer primary winding are alternately energized at the rate corresponding to a vehicle speed in excess of 65 miles an hour, the impedance of these windings is so great that too little current flows in the circuits of these windings and in the windings of relays RL and RM to operate these relays. Accordingly, the contacts of these relays remain in one position and energy is not supplied through the transformers TL and TM to the relays L and M so that the contacts of these relays remain released.

As a result of the supply of energy to the primary winding of transformer TH, energy is induced in the secondary winding and is supplied therefrom through rectifiers K to the relay H. Accordingly, when the train is traveling at a speed above 65 miles an hour, the relay H is picked up while the other relays are released. As a result, the magnet valve device MV is energized over a circuit which is traced from terminal B through front contact 16 of relay H, winding of magnet valve device MV and contact of switch P to terminal C, while valve device HV is energized over the circuit which includes front contact 16 of relay H, back contact 18 of relay M, winding of device HV and contact of switch P.

As the valve devices MV and HV are both energized, the brake equipment is conditioned to permit the maximum brake cylinder pressure to be developed to thereby permit the maximum braking force to be exerted.

When the train speed is reduced to a rate below 65 miles an hour, the rate of alternate energization of the two parts of the primary winding of transformer TH is reduced sufficiently that enough energy flows in the circuits of these windings to operate relay RM, but not to operate relay RL.

As a result of movement of contact 20 of relay RM between its two positions, energy is alternately supplied to the two portions of the primary winding of transformer TM, while contact 21 rectifies the current supplied from the secondary winding of the transformer TM to the upper winding of relay M so that the contacts of relay M pick up. Accordingly, contact 18 relay M picks up and interrupts the circuit of valve device HV, while device MV continues to be energized over the circuit which includes front contact 16 of relay H. When device MV is energized and the device HV is deenergized, the brake equipment is conditioned to provide the high intermediate value of brake cylinder pressure suitable for speeds below 65 miles an hour, but in excess of 40 miles an hour.

As the speed of the vehicle reduces, because of the reduction in the impedance of the primary windings of transformer TH, there is an increase in the value of the energy in the circuits of the transformer primary windings and in the windings of relays RL and RM. When the train speed is reduced to 40 miles an hour or less, sufficient energy flows in the circuits of the windings of relays RL to operate this relay, while relay RM continues to operate.

As a result of movement of contact 24 of relay RL between its two positions, energy is alternately supplied to the two portions of the primary winding of transformer TL so that energy is induced in the secondary winding of this transformer, while contact 25 rectifies the energy supplied from the transformer secondary to the upper winding of relay L. Accordingly, relay L picks up and its contact 26 interrupts the circuit of the relay H, while its contacts 28 and 29 interrupt the circuits connecting the entire windings of relay RM in series with the portions of the primary winding of transformer TH and establish circuits connecting portions only of these windings in these circuits. In addition, on picking up of the contacts of relay L its contact 31 establishes the circuit of the holding winding of relay L to maintain the contacts of this relay picked up as long as any pressure remains in the brake cylinder and the switch P is closed.

On this change from energization of the entire windings of relay RM to energization of portions only of these windings the relay RM ceases to operate and energy is no longer supplied through transformer TM to relay M so that the relay M releases and its contact 30 interrupts the circuit of the lower or holding winding of the relay before contact 32 of relay H becomes released to complete this circuit. This sequence of operation of the relays M and H is certain to occur since the relay H is slow in releasing.

At this time as relays M and H are released, contact 33 of relay M interrupts the circuit of valve device LV, while contact 16 of relay H interrupts the circuits of the valve devices MV and HV. As all of the valve devices are deenergized, the brake equipment is conditioned to permit a low intermediate brake cylinder pressure appropriate for speeds below 40 miles an hour, but in excess of 20 miles an hour, to be developed.

On a subsequent reduction in the speed of the vehicle to a rate less than 20 miles an hour the energy flowing in the circuits of the portions of the windings of relay RM and the primary winding of transformer TH increases to a value high enough to operate the relay RM and energy is thereupon supplied through the transformer TM to the upper winding of relay M. As a result, the contacts of relay M pick up and contact 30 establishes the circuit of the relay holding winding. This circuit is traced from terminal B through back contact 32 of relay H, front contact 30 of relay M, holding winding of relay M, front contact 31 of relay L and contact of switch P to terminal C. Accordingly, the relay M will remain picked up even after the speed of the train is reduced to a point at which the impulses of energy supplied through the transformer TM are too infrequent to maintain the relay contacts picked up.

At this time as relays M and L are maintained picked up by energy supplied to their holding windings, the circuit of the magnet valve device LV is established and includes front contact 33 of relay M, front contact 35 of relay L and back contact 36 of relay H. The device LV when energized conditions the brake equipment to provide the low brake cylinder pressure appropriate for speeds below 20 miles an hour.

When the vehicle stops, the contact 19 is no longer operated and the windings of the relays RL and RM are not alternately energized so that energy is not supplied through transformer TL to relay L and through transformer TM to relay M. However, as pointed out above, these relays are maintained picked up by energy supplied to their holding windings so that as the train comes to a stop, the device LV is maintained energized and conditions the brake equipment to limit the braking effect to a low value appropriate for these speeds to thereby insure a smooth stop.

When the brakes are released, the contact of switch P releases and interrupts the circuits of the holding windings of relays M and L so that the contacts of these relays release and the equipment again assumes its normal condition.

It will be seen that this invention provides an improved form of speed responsive equipment requiring a minimum of apparatus. It will be seen also that this system is arranged so that the various parts of the apparatus are normally deenergized and become energized only during an application of the brakes so that the wear on the equipment is reduced to a minimum.

In addition, the equipment is arranged so that following a brake application while the vehicle is traveling at a high speed circuits are established to maintain portions of the equipment energized when the vehicle speed is reduced to a low value at which the energy supplied through the transformers TL and TM is insufficient for this purpose. This permits the equipment to be arranged so that when all the relays are released, the brake equipment will be conditioned to permit a substantial braking force to be exerted. This is advantageous as it insures that if the speed responsive apparatus fails to function for any reason, such as failure of the source of current, the braking power will not be unduly limited but will be adequate to bring the vehicle to a stop within a reasonable distance.

Although I have herein shown and described only one form of speed responsive apparatus embodying my invention, it is understood that various changes and modifications may be made therein within the scope of the appended claims without departing from the spirit and scope of my invention.

Having thus described my invention, what I claim is:

1. In apparatus of the class described, in combination, a first and a second polarized relay, a transformer, means operative in accordance with the speed of a moving member for alternately establishing connection from a source of direct current to a first and a second circuit, each of said circuits including in series therewith a winding of the first relay, a winding of the second relay and a primary winding of the transformer, the energy supplied over the first circuit being effective to move the contacts of said relays to one position and to develop flux of one polarity in the transformer core, the energy supplied to the second circuit being effective to move the contacts of the relays to their second position and to develop flux of the other polarity in said transformer core, said relays and said transformer being proportioned so that when the rate of alternate establishment of said circuits exceeds a predetermined value, the energy flowing therein is insufficient to operate one of said relays and when the rate of alternate establishment of said circuits exceeds a higher predetermined value the energy flowing therein is insufficient to operate either of said relays, a first, a second and a third control device, means responsive to movement of the contacts of the first polarized relay between their two positions for supplying energy to the first control device, means responsive to movement of the contacts of the second polarized relay between their two positions for supplying energy to the second control device, means for supplying energy from the transformer secondary winding to the third control device, and means governed by said control devices for governing said moving member.

2. In apparatus of the class described, in combination, a first and a second polarized relay, a transformer, means operative in accordance with the speed of a moving member for alternately establishing connection from a source of direct current to a first and a second circuit, each of said circuits including in series therewith a winding of the first relay, a winding of the second relay and a primary winding of the transformer, the energy supplied over the first circuit being effective to move the contacts of said relays to one position and to develop flux of one polarity in the transformer core, the energy supplied over the second circuit being effective to move the contacts of the relays to their second position and to develop flux of the other polarity in said transformer core, said relays and said transformer being proportioned so that when the rate of alternate establishment of said circuits exceeds a predetermined value the energy flowing therein is insufficient to operate one of said relays and when the rate of alternate establishment of said circuits exceeds a higher predetermined value the energy flowing therein is insufficient to operate either of said relays, a first, a second and a third control device, means responsive to movement of the contacts of the first polarized relay between their two positions for supplying energy to the first control device, means responsive to movement of the contacts of the second polarized relay between their two positions for supplying energy to the second control device, means governed by one of said relays for supplying energy from the transformer secondary winding to the third control device, and means governed by said control devices for governing said moving member.

3. In apparatus of the class described in combination, a first and a second polarized master relay, a first, a second and a third control relay, a transformer, means operative in accordance with the speed of a moving member for alternately establishing connection from a source of direct current to a first and a second circuit, each of said circuits including in series therewith a winding of the first master relay, a winding of the second master relay and a primary winding of the transformer, the energy supplied over said first circuit being effective to move the contacts of said relays to one position and to develop flux of one polarity in the transformer core, the energy supplied over the second circuit being effective to move the contacts of the relays to their other positions and to develop flux of the other polarity in said transformer core, the first control relay governing the winding of the second master relay and being effective when released to include all of said winding in one of said circuits and when picked up to include a portion only of said winding in one of said circuits, the first master relay and the transformer being proportioned so that the energy flowing in said first and second circuits is effective to operate said relay only when the rate of alternate establishment of said circuits is less than a predetermined medium value, the second master relay and transformer being proportioned so that when the entire winding of said relay is included in one of said circuits the energy flowing in said circuit is effective to operate the relay until the rate of alternate establishment of said circuits is increased above a predetermined high value and when said portion only of the winding of said relay is included in said circuit the energy flowing in said circuit is effective to operate the relay only when the rate of alternate establishment of said circuits is less than a predetermined low value, means responsive to movement of the contacts of the first master relay for supplying energy to the first control relay, means responsive to movement of the contacts of the second master relay for supplying energy to the second control relay, means for supplying energy from the transformer secondary winding to the third control relay, and means governed by said first, second and third control relays for controlling said moving member.

4. In apparatus of the class described, in combination, a transformer, means for establishing in the core of the transformer a first flux of a given polarity, means operative in accordance with the speed of a moving member for periodically supplying direct current to the transformer primary winding to establish in the transformer core a second flux of a polarity opposite to that of the first flux, a first and a second master relay each having a winding included in series with the transformer primary winding, a first, a second and a third control relay, the first control relay governing the winding of the second master relay and being effective when released to include all of said winding in the circuit of the transformer primary winding and effective when picked up to include a portion only of said winding in the circuit of the transformer primary winding, the first master relay and the transformer being proportioned so that the energy flowing in the circuit of the transformer primary winding effectively energizes said first master relay only when the rate of periodic supply of energy to the transformer primary winding is below a medium value, the second master relay and the transformer being proportioned so that when the entire winding of the relay is included in the circuit of the transformer primary winding the energy flowing in said circuit effectively energizes said relay until the rate of periodic supply of energy to said transformer primary winding exceeds a high value and so that when said portion only of said relay winding is included in the circuit of the transformer primary winding the energy flowing in said circuit effectively energizes said relay only as long as the rate of periodic supply of energy to said transformer primary winding is below a low value, means governed by the first master relay for supplying energy to the first control relay, means governed by the second master relay for supplying energy to the second control relay, means for supplying energy from the transformer secondary winding to the third control relay, and means governed by said first, second and third control relays for controlling said moving member.

5. In apparatus of the class described, in combination, a transformer, means for establishing in the core of the transformer a first flux of a given polarity, means operative in accordance with the speed of a moving member for periodically supplying direct current to the transformer primary winding to establish in the transformer core a second flux of a polarity opposite to that of the first flux, a first and a second master relay each having a winding included in series with the transformer primary winding, a first, a second and a third control relay, the first control relay governing the winding of the second master relay and being effective when released to include all of said winding in the circuit of the transformer primary winding and effective when picked up to include a portion only of said winding in the circuit of the transformer primary winding, the first master relay and the transformer being proportioned so that the energy flowing in the circuit of the transformer primary winding effectively energizes said first master relay only when the rate of periodic supply of energy to the transformer primary winding is below a medium value, the second master relay and the transformer being proportioned so that when the entire winding of the relay is included in the circuit of the transformer primary winding the energy flowing in said circuit effectively energizes said relay until the rate of periodic supply of energy to said transformer primary winding exceeds a high value and so that when said portion only of said relay winding is included in the circuit of the transformer primary winding the energy flowing in said circuit effectively energizes said relay only as long as the rate of periodic supply of energy to said transformer primary winding is below a low value, means governed by the first master relay for supplying energy to the first control relay, means governed by the second master relay for supplying energy to the second control relay, means governed by the first control relay for supplying energy from the transformer secondary winding to the third control relay, and means governed by the first, second and third control relays for controlling said moving member.

6. In apparatus for use on a vehicle having braking apparatus capable of developing one degree of braking power, in combination, a normally released relay effective when picked up to condition the braking apparatus to provide only a lesser degree of braking power, means responsive to movement of the vehicle for supplying to said relay energy the value of which varies in accordance with the speed of the vehicle, said means being operative to supply energy effective to pick up said relay only when the vehicle speed exceeds a substantial rate, means effective on picking up of the contacts of said relay to establish a holding circuit to also supply energy to said relay, and means for interrupting said holding circuit.

7. In apparatus for use on a vehicle having braking apparatus capable of developing one degree of braking power, in combination, a normally released relay effective when picked up to condition the braking apparatus to provide only a lesser degree of braking power, means responsive to movement of the vehicle and effective only during movement of the vehicle at speeds below a predetermined speed for supplying to a relay impulses of energy at rates which vary in accordance with the speed of the vehicle, said energy impulses being of a value such that they are effective to maintain said relay picked up only when they are supplied to the relay at rates above that present at very low vehicle speeds, a holding circuit for said relay established on picking up of the relay contacts, and means for interrupting said holding circuit.

ANDREW J. SORENSEN.